Feb. 10, 1925.    1,525,557
C. KLEINSCHMIDT
AIRCRAFT
Filed Nov. 25, 1922    2 Sheets-Sheet 1

INVENTOR.
CONRAD KLEINSCHMIDT.
BY A.B.Bowman
ATTORNEY

Feb. 10, 1925.

C. KLEINSCHMIDT

AIRCRAFT

Filed Nov. 25, 1922

1,525,557

2 Sheets-Sheet 2

INVENTOR.
CONRAD KLEINSCHMIDT.
BY A.B.Bowman
ATTORNEY

Patented Feb. 10, 1925.

1,525,557

UNITED STATES PATENT OFFICE.

CONRAD KLEINSCHMIDT, OF SAN DIEGO, CALIFORNIA.

AIRCRAFT.

Application filed November 25, 1922. Serial No. 603,205.

*To all whom it may concern:*

Be it known that I, CONRAD KLEINSCHMIDT, a citizen of the United States, residing at San Diego, in the county of San Diego and State of California, have invented certain new and useful Improvements in Aircraft, of which the following is a specification.

My invention relates to aircraft, particularly to those heavier than air in the form of airplanes and the objects of my invention are first, to provide an airplane in which the angle of incidence of the wings can be easily changed relatively to the fuselage as desired; second to provide an airplane in which the angle of incidence of the wings can be changed when in flight, thus permitting the banking of the airplane against the air when it is desired to slow up as in landing; third, to provide an airplane of this class, in which the wings can be manually shifted and adjusted relatively to the fuselage; fourth, to provide an airplane of this class, in which the wings can be easily locked in a certain position relatively to the fuselage when desired; fifth, to provide a heavier than air aircraft in which the wings and motor can be shifted angularly with the fuselage or passenger carriage so that the same can be positioned at a right angle with the normal direction of flight, thus transforming the aircraft into helicopter form for direct upward flight; sixth, to provide a novelly constructed airplane of this class and seventh, to provide an airplane of this class which is very simple and economical of construction proportionate to its functions, durable, efficient and which will not readily deteriorate or get out of order.

Figure 1:
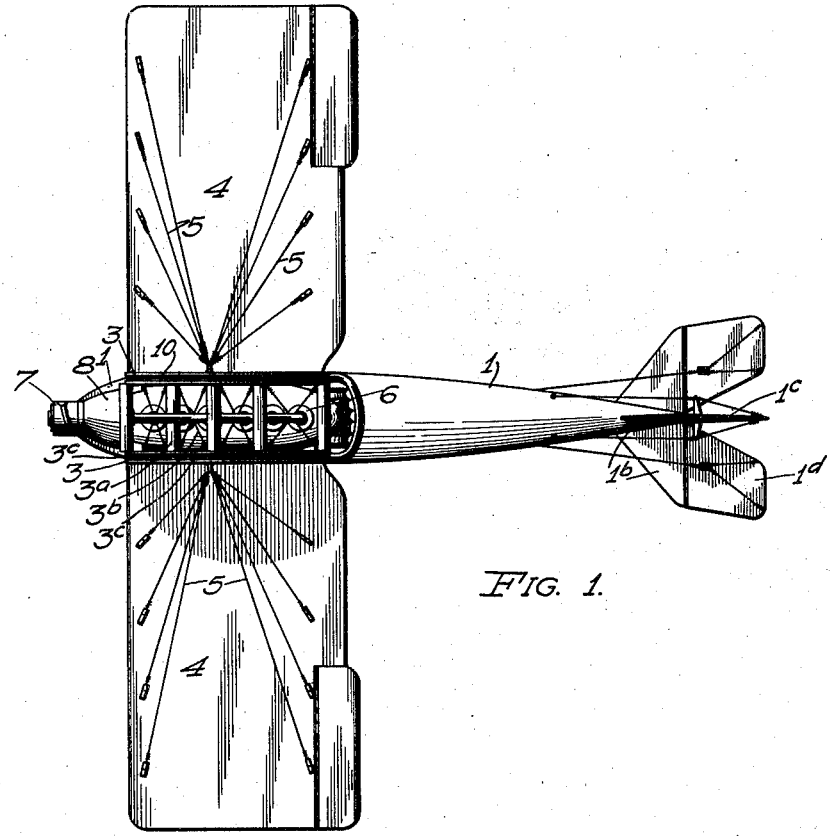
Figure 2:
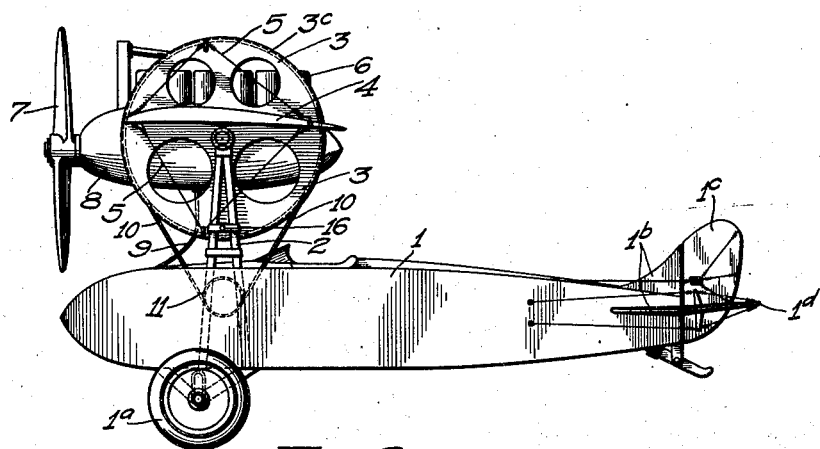
Figure 3:
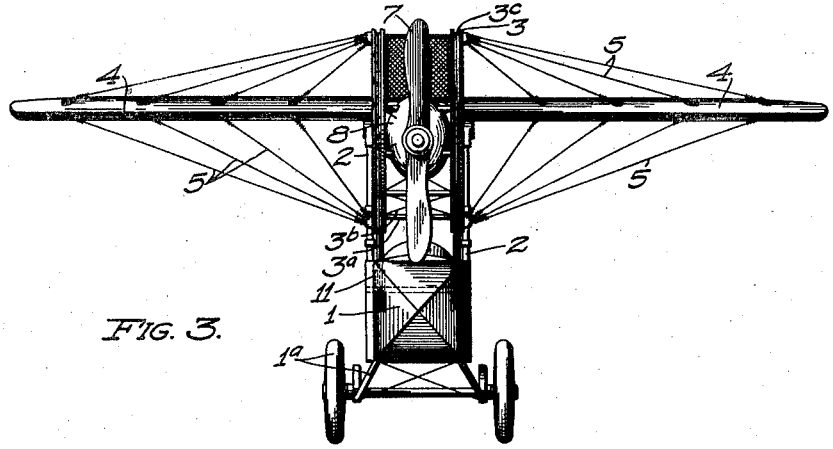
Figure 4:
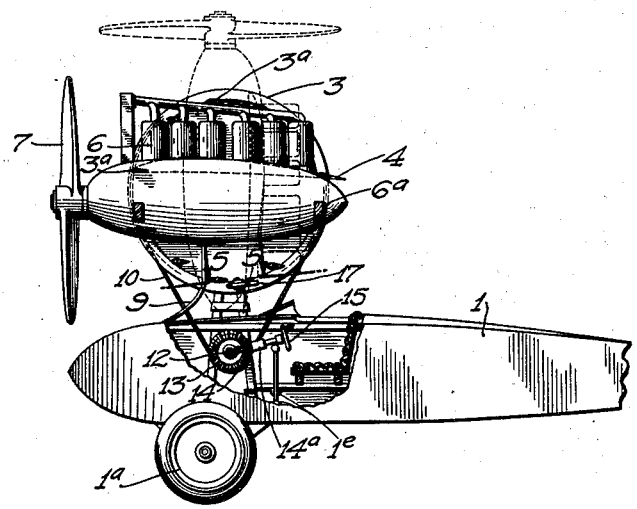
Figure 5:
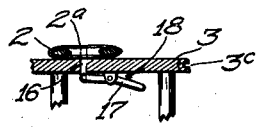

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of my airplane structure; Fig. 2 is a side elevational view thereof; Fig. 3 is a front elevational view of the airplane; Fig. 4 is a fragmentary, side elevational view thereof, with one wing, its support and a portion of the fuselage broken away and in section to facilitate the illustration and showing by dotted lines certain shifted positions of the wings and motor relatively to the fuselage, and Fig. 5 is an enlarged fragmentary sectional view taken through 5—5 of Fig. 4 showing the arrangement of the wing and motor locking mechanism.

Like characters of reference refer to similar parts and portions throughout the several views of the drawings.

The fuselage 1, journal supports 2, wing and motor supports 3, wings 4, guy wires 5, motor 6, propeller 7, motor casing 8, fuel conductor 9, cables 10, sheaves 11, shaft 12, bevel gear 13, bevel pinion 14, hand wheel 15, bolt 16, lever 17 and the spring 18 constitute the principal parts and portions of my airplane structure.

My airplane is preferably of the monoplane type and is so constructed that the center of gravity of its load falls considerably below its sustaining means or planes, thus insuring inherent lateral stability. The fuselage or passenger carriage 1 of my airplane is similar to that of the conventional airplane and is provided with the conventional undercarriage $1^a$, tail stabilizers $1^b$, rudder $1^c$, elevators $1^d$ and the control mechanism $1^e$. Provided near the front portion of the fuselage are the journal supports 2 which are secured to the sides of the longérons of the fuselage and extend preferably some distance above the same. Rotatably mounted on the journal supports are the wing and motor supports 3 which are preferably in the form of discs. The wing and motor supports are positioned between the journal supports and are spaced from each other by the struts $3^a$ and mutually reinforced by the guy wires $3^b$. The wings 4 are supported on the wing supports above the journal portions thereof by the guy wires 5 at the top and bottom of the wings preferably as shown in the drawings. Between these wing supports is positioned the motor 6 and is supported thereon by the motor bearers $6^a$. The motor is provided on its shaft with a conventional airplane propeller 7 and is encased in the stream lined casing 8 to reduce the head resistance of the same. The motor is connected to the fuel supply tank, which is preferably supported in the fuselage, by the flexible conductor 9. The wing supports 3 are provided with circumferential grooves 3ᶜ for the reception of the cables 10, which extend around the same a sufficient number of times to insure a sufficient frictional contact. Sheaves 11 are mounted on the shaft 12 which is revolubly mounted within the fuselage and preferably supported at the lower ends of the journal supports 2. The cables 10 also extend around these sheaves which are adapted to rotate the wing supports 3 about their axes and thus change the angle of the wings relatively to the fuselage. To facilitate the shifting or adjusting of the wings as described, I have provided a bevel gear 13 on the shaft 12 which meshes with a beveled pinion 14, the hub of which is revolubly mounted in the journal 14ᵃ and on the end of which is mounted a hand wheel 15 which is readily accessible from the operator's seat as shown best in Fig. 4 of the drawings. Pivotally mounted on the inside of the wing support is a lever 17. To the one end of this lever is pivotally secured a bolt 16 which extends through the wing support and is adapted to engage the journal support 2 at the hole 2ᵃ as shown in Fig. 5 of the drawings. A spring 18 is interposed between the handle portion of the lever 17 and the wing support 3 to retain the wing support and wings in a certain locked position relatively to the fuselage.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

From this construction it is obvious that there is provided an airplane in which the angle of incidence of the wings can be easily changed relatively to the fuselage as desired; in which such angle can be easily changed when in flight; in which the wings can be manually shifted and adjusted relatively to the fuselage and in which the wings can be easily locked in a certain position relatively to the fuselage; that I have provided an airplane which is so constructed that it can be easily shifted to bank against the air in front of the plane when it is desired to slow up as in landing; that I have provided an airplane of this class which has great inherent lateral stability; that I have provided an aircraft, heavier than air, in which the wings and motor can be readily shifted to a right angle with the fuselage or normal direction of flight, thus substantially transforming the aircraft into helicopter form for direct upward flight; that I have provided a novelly constructed airplane of this class, and that I have provided an airplane which is very simple and economical of construction proportionate to its functions, durable, efficient and which will not readily deteriorate or get out of order.

Having thus described my invention what I claim as new and desire to secure by Letters Patent, is:

1. In a monoplane, a fuselage, wings pivotally mounted on an axis at a substantial right angle with the longitudinal axis of said fuselage, the pivotal axis of said wings being positioned above said fuselage, and a motor rigidly supported by said wings and shiftable therewith.

2. In an airplane, a fuselage, a pair of disc-shaped wing supports rotatably supported on a horizontal axis above and to either side of said fuselage and provided with sheave portions at their peripheries, wings of a width substantially equal to the diameter of said disc-shaped wing supports, supported by said wing supports and extending outwardly therefrom, sheaves revolubly mounted in said fuselage, cables connecting said sheaves in said fuselage with the sheave portions of said wing supports, and means to facilitate the rotating of said sheaves in said fuselage.

3. An airplane, including a fuselage, wings pivotally mounted on an axis at a substantial right angle with the longitudinal axis of the fuselage, the pivotal axis of said wings being positioned above said fuselage, and a motor supported by said wings and shiftable therewith.

4. In an airplane, a fuselage, a pair of disc-shaped wing supports rotatably supported on a horizontal axis above and to either side of said fuselage and provided with sheave portions at their peripheries, wings of a width substantially equal to the diameter of said disc-shaped wing supports, supported by said wing supports and extending outwardly therefrom, sheaves revolubly mounted in said fuselage, cables connecting said sheaves in said fuselage with the sheave portions of said wing supports, means to facilitate the rotating of said sheaves in said fuselage, and a motor mounted between said disc-shaped wing supports and shiftable therewith relatively to said fuselage.

5. In an airplane, a fuselage, a pair of disc-shaped wing supports rotatably supported on a horizontal axis at a substantial right angle with the longitudinal axis of said fuselage and above and to either side thereof, a wing supported at the outer side of and extending outwardly from each of said disc-shaped wing supports, and a motor rigidly supported between and by said wing supports between the inner ends of said wings and shiftable with said wings.

6. An airplane, including a fuselage, wing supports rotatably supported on an axis at a right angle with the longitudinal axis of said fuselage, the axis of said supports being also positioned a considerable distance above the fuselage, wings secured to said supports and extending outwardly therefrom and a motor mounted on said wing supports and rotatable therewith.

In testimony whereof, I have hereunto set my hand, at San Diego, California, this 18th day of November, 1922.

CONRAD KLEINSCHMIDT.